United States Patent
Arnold et al.

(10) Patent No.: US 10,735,386 B2
(45) Date of Patent: Aug. 4, 2020

(54) IPSEC SELECTOR COALESCING FOR PER-HOST SECURITY ASSOCIATION

(71) Applicant: ADTRAN, INC., Huntsville, AL (US)

(72) Inventors: Michael Arnold, Huntsville, AL (US); Tyler Pearson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 194 days.

(21) Appl. No.: 15/886,586

(22) Filed: Feb. 1, 2018

(65) Prior Publication Data

US 2019/0238522 A1  Aug. 1, 2019

(51) Int. Cl.
*G06F 21/00* (2013.01)
*H04L 29/06* (2006.01)

(52) U.S. Cl.
CPC ...... *H04L 63/0485* (2013.01); *H04L 63/0236* (2013.01); *H04L 63/104* (2013.01); *H04L 63/166* (2013.01); *H04L 63/205* (2013.01); *H04L 63/0272* (2013.01)

(58) Field of Classification Search
CPC ... H04L 63/164; H04L 63/08; H04L 63/0485; H04L 63/0272; H04L 63/0428; H04L 63/02; H04L 29/06
See application file for complete search history.

(56) References Cited

U.S. PATENT DOCUMENTS

| | | | | |
|---|---|---|---|---|
| 2007/0157305 A1* | 7/2007 | Dajiang | .................. | H04L 63/06 726/14 |
| 2009/0097417 A1* | 4/2009 | Asati | ...................... | H04L 45/00 370/255 |

* cited by examiner

*Primary Examiner* — Ghazal B Shehni
(74) *Attorney, Agent, or Firm* — Fish & Richardson P.C.

(57) ABSTRACT

Methods, systems, and apparatus for Internet Protocol security (IPsec) selector coalescing for per-host Security Associations (SAs) are disclosed. In one aspect, separate per-host SAs are assigned, by a network communications device including one or more processors, to each of two or more different source communication devices that each communicates with corresponding destination devices. While the separate per-host SAs are assigned to each of the two or more different source communication devices, a group SA is generated. The group SA is assigned, by the network communications device, to all of the two or more different source communication devices. The assignment of the separate per-host SAs is removed from each of the two or more different source communication devices.

20 Claims, 6 Drawing Sheets

IPSEC SELECTOR COALESCING FOR PER-HOST SECURITY ASSOCIATION

BACKGROUND

This specification relates to Internet Protocol security (IPsec) selector coalescing for per-host Security Associations (SAs).

In IPsec, an SA defines security attributes used for secure communications between two endpoints. The SA is unidirectional, and an SA selector defines traffic that is permitted to use an IPsec SA.

SUMMARY

In general, one innovative aspect of the subject matter described in this specification can be embodied in methods for Internet Protocol security (IPsec) selector coalescing for IPsec Virtual Private Networks (VPNs). One example computer-implemented method includes assigning, by a network communications device including one or more processors, separate per-host Security Associations (SAs) to each of two or more different source communication devices that each communicates with corresponding destination devices, while the separate per-host SAs are assigned to each of the two or more different source communication devices, generating a group SA, assigning, by the network communications device, the group SA to all of the two or more different source communication devices, and removing the assignment of the separate per-host SAs from each of the two or more different source communication devices.

Particular embodiments of the subject matter described in this specification can be implemented so as to realize one or more of the following advantages. For example, the methods, devices, and/or systems described in the present disclosure can coalesce, by a network communications device, multiple existing per-host SAs into a single group SA. No modification to IPsec is needed to facilitate the coalescing. After assigning the multiple per-host SAs to multiple source communication devices, each communicating with corresponding destination communication devices, the network communications device generates the single group SA based on, for example, Internet Protocol (IP) addresses of the multiple source communication devices and IP addresses of the corresponding destination communication devices. The network communications device assigns the single group SA to the multiple source communication devices, and removes the assignment of the multiple per-host SAs from the multiple source communication devices. In doing so, the single group SA, replacing the multiple per-host SAs, is stored in an SA database of the network communications device for secure communications between the multiple source communication devices and the corresponding destination communication devices. As a result, the SA database with a limited capacity can store assigned SAs for a large number of source and destination communication devices, thereby resulting in more efficient use of a limited amount of memory available in the network communications device. In addition, since the SA database stores the single group SA replacing the multiple per-host SAs, the likelihood of prohibiting a new SA or removing an existing SA in the SA database to accommodate the new SA will be reduced.

While some aspects of this disclosure refer to computer-implemented software embodied on tangible media that processes and transforms data, some or all of the aspects may be computer-implemented methods or further included in respective systems or devices for performing the described functionality. The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
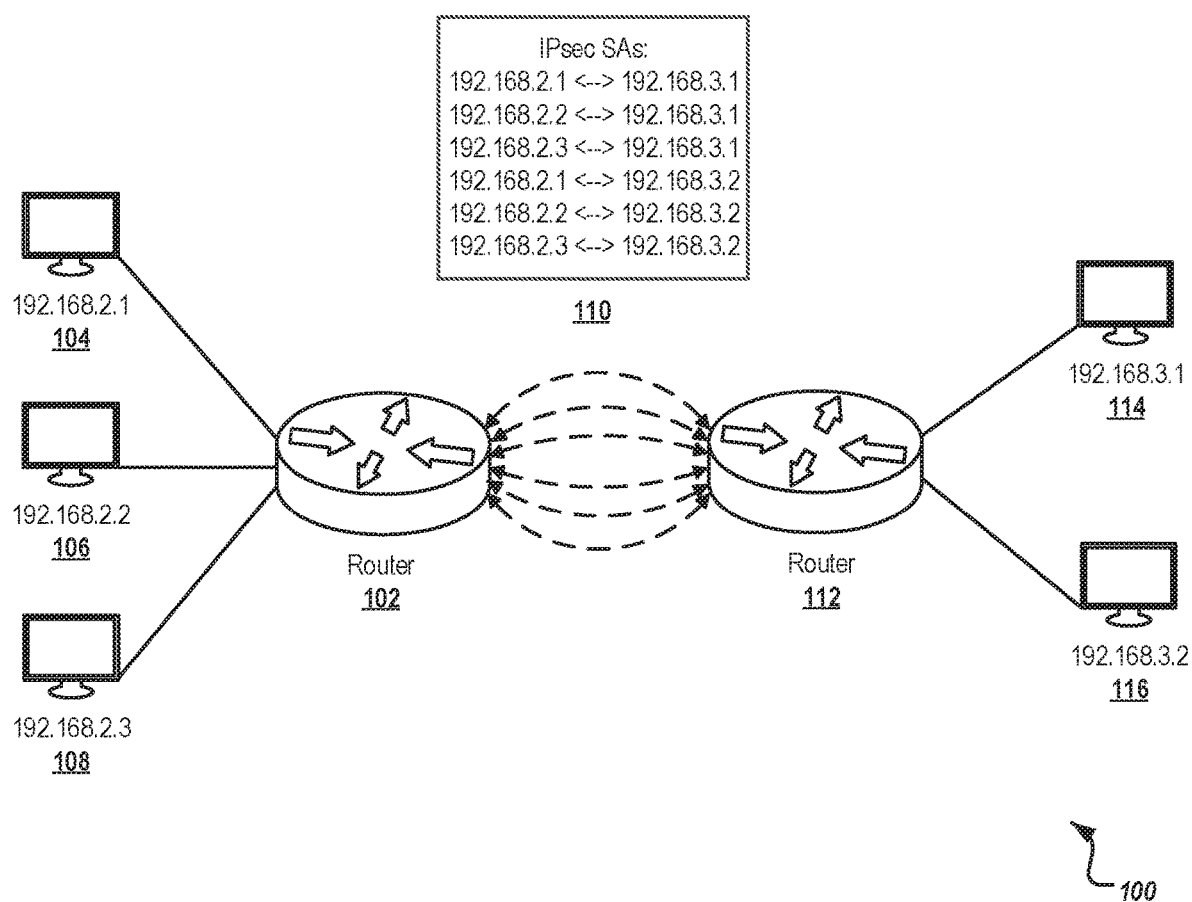
FIG. 1 is a block diagram illustrating an example prior art networking environment for per-host Security Associations (SAs).

This document describes methods, systems, and apparatus for Internet Protocol security (IPsec) selector coalescing for IPsec Virtual Private Networks (VPNs) that is performed by a network communications device (e.g., a router). For example, a network communications device assigns separate per-host Security Associations (SAs) to each of two or more different source communication devices, each communicating with corresponding destination communication devices through the network communications device. While the separate per-host SAs are assigned to each of the two or more different source communication devices, the network communications device generates a group SA for the two or more different source communication devices. The network communications device assigns the group SA to all of the two or more different source communication devices, and removes the assignment of the separate per-host SAs from each of the two or more different source communication devices. Although this disclosure refers to IPsec VPNs for purposes of example, the subject matter of this document can be applied to other types of networks.

IPsec VPNs can provide protection to end user traffic by authenticating nodes (e.g., routers) in a network (e.g., an enterprise network, a home computer network) to each other, and by encrypting data payloads transmitted between the authenticated nodes. For example, VPN nodes can negotiate SAs that define traffic to protect based on source and destination Internet Protocol (IP) addresses of the traffic, prior to transmitting the traffic. An SA can describe various numbers of source and/or destination IP addresses. The IP addresses can be defined, for example, by Variable Length Subnet Masking (VLSM). For example, a traffic selector of an SA (e.g., 192.168.2.0/30 to 192.168.3.0/28) defines two IP addresses in a source subnet (e.g., 192.168.2.0/30) and sixteen IP addresses in a destination subnet (e.g., 192.168.3.0/28) that are used by the SA.

Once the SAs are negotiated, each SA is stored in a node's SA database. Using an SA database, a node can maintain a list of hosts to protect payloads of the hosts, via VPN tunnels, to other nodes. Normally, an SA database in a node is limited in size. As a result, the number of active SAs that can be stored in the SA database is limited. In addition, networks utilizing a per-host level selector mechanism dynamically define a traffic selector for an SA, based on the source and destination IP addresses of a packet to be protected. With n source hosts communicating with m destination hosts, up to m*n*2 SAs may be negotiated based on per-host SAs, and stored in a node's SA database (e.g., m*n SAs in one direction for encryption and m*n SAs in the other direction for decryption). When the SA database is full (e.g., there is no space in the SA database to store new SAs), negotiation of new SAs is prohibited or includes first deleting one or more existing SAs in the SA database. This causes severe service disruptions to end users and results in unpleasant customer experience for the end users.

The following disclosure describes several techniques for automatically applying coalescing to IPsec SA selectors. In some implementations, a network communications device (e.g., a router) assigns separate per-host SAs to each of two or more different source communication devices. Each source communication device communicates with one or more corresponding destination communication devices through the network communications device. While the separate per-host SAs are assigned to each of the two or more different source communication devices (e.g., the separate per-host SAs are stored in an SA database of the network communications device), the network communications device generates a group SA for the two or more different source communication devices. The network communications device automatically assigns the group SA to all of the two or more different source communication devices (e.g., the group SA is stored in the SA database of the network communications device), and automatically removes the assignment of the separate per-host SAs from each of the two or more different source communication devices (e.g., the separate per-host SAs are removed from the SA database of the network communications device). The group SA is used by the network communications device for secure communications (e.g., via VPN tunnels) between all of the two or more different source communication devices and the corresponding destination communication devices, rather than using a separate per-host SAs for these devices.

FIG. 1 is a block diagram illustrating an example prior art networking environment 100 for per-host Security Associations (SAs). As illustrated in FIG. 1, the network environment 100 includes router 102 and router 112. The router 102 has three hosts, 104, 106, and 108, with IP addresses 192.168.2.1, 192.168.2.2, and 192.168.2.3, respectively. The router 112 has two hosts, 114 and 116, with IP addresses 192.169.3.1 and 192.168.3.2, respectively.

Using per-host SAs, six IPsec SAs 110 are negotiated between the router 102 and the router 112 for secure communications between the three hosts, 104, 106, and 108, and the two hosts, 114 and 116. For example, at the router 102, the three hosts, 104, 106, and 108, are source hosts and the two hosts, 114 and 116, are destination hosts. An SA database of the router 102 stores the six IPsec SAs 110 with the three source hosts, 104, 106, and 108, and the two destination hosts, 114 and 116. The SAs are unidirectional.

At the router 112, the two hosts, 114 and 116, are source hosts and the three hosts, 104, 106, and 108, are destination hosts. An SA database of the router 112 stores the six IPsec SAs 110 with the two source hosts, 114 and 116, and the three destination hosts, 104, 106, and 108.

When the router 102 has 254 hosts, and the router 112 has 254 hosts, 129,032 per-host SAs may be negotiated between the router 102 and the router 112. As a result, the SA database of the router 102 may store 129,032 SAs, and the SA database of the router 112 may also store 129,032 SAs. As the number of hosts connected to the router 102 and/or the router 112 increases, the number of SAs stored in the SA database of the router 102 and/or the SA database of the router 112 increases, which will require more storage (e.g., more memory hardware) in order to store the increased number of SAs. However, as noted above, the memory available to store SAs is generally limited, which can result in the amount of memory required to store the additional SAs being greater than the amount of memory that is available. As such, techniques are needed to more efficiently manage the storage of SAs, thereby improving the ability to support larger numbers of communications links between communication devices.

Figure 2:
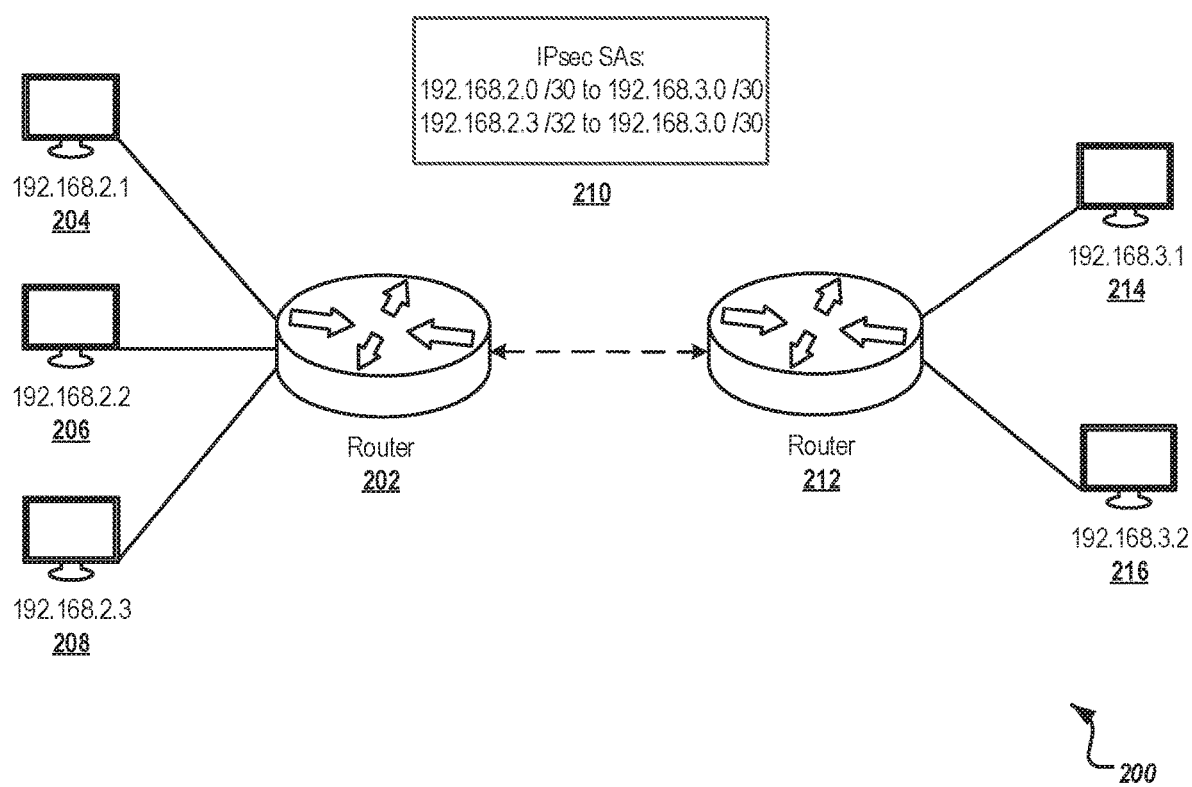
FIG. 2 is a block diagram illustrating an example networking environment for Internet Protocol security (IPsec) selector coalescing for per-host SAs, according to an implementation of the present disclosure.

FIG. 2 is a block diagram illustrating an example networking environment 200 for IPsec selector coalescing for per-host SAs, according to an implementation of the present disclosure. The IPsec SAs 210 differs from the IPsec SAs 110 described with reference to the prior art networking environment 100, for example, because multiple per-host SAs, once negotiated and assigned, can be renegotiated and coalesced into a group SA. As illustrated in FIG. 2, the networking environment 200 includes router 202 and router 212. The router 202 has three hosts, 204, 206, and 208, with IP addresses 192.168.2.1, 192.168.2.2, and 192.168.2.3, respectively. The router 212 has two hosts, 214 and 216, with IP addresses 192.169.3.1 and 192.168.3.2, respectively. In some implementations, the networking environment 200 may include additional and/or different components not shown in the block diagram, such as one or more hosts, one or more routers, or a combination of these and other technologies. In some implementations, components may also be omitted from the networking environment 200. The components illustrated in FIG. 2 may be similar to, or different from, those described in FIG. 1.

As discussed in FIG. 1, using per-host SAs, the router 202 and the router 212 can negotiate six per-host SAs (e.g., the IPsec SAs 110) for secure communications between the three hosts, 204, 206, and 208, and the two hosts, 214 and 216. For example, after the negotiation, the router 202 can assign six per-host SAs to the three hosts, 204, 206, and 208, each communicating with the two hosts, 214 and 216. The router 202 then stores the six per-host SAs in an SA database of the router 202. In some implementations, the SA database of the router 202 can be stored locally in the router 202 or remotely in the router 202. Similarly, the router 212 can assign six per-host SAs to the two hosts, 214 and 216, each communicating with the three hosts, 204, 206, and 208. The router 212 then stores the six per-host SAs in an SA database of the router 212. Although the discussion in FIG. 2 focuses on the router 202 for purposes of example, the subject matter of this document can be performed by the router 212, or any suitable device.

To use the SA database of the router 202 efficiently, the router 202 can, for example, renegotiate and coalesce multiple existing SAs stored in the SA database. In some implementations, the router 202 can implement an IPsec subnet coalescing technique (described in detail in FIG. 3)

to perform the IPsec selector coalescing for per-host SAs. For purposes of example, assume the router 202 initially negotiated six SAs (e.g., the IPsec SAs 110 in FIG. 1) with the router 212 using per-host level selectors. The six per-host SAs are assigned to the three source hosts, 204, 206, and 208, and the two destination hosts, 214 and 216. In addition, the six per-host SAs are stored in the SA database of the router 202.

With the IPsec subnet coalescing technique, the router 202 can determine that a contiguous block of source and/or destination IP addresses can be formed from multiple existing entries in the SA database. For the source IP addresses, 192.168.2.1 and 192.168.2.2 can form a contiguous block of source IP addresses, 192.168.2.0/30. For the destination IP addresses, 192.168.3.1 and 192.168.3.2 can form a contiguous block of destination IP addresses, 192.168.3.0/30. The router 202 then can renegotiate SAs with the router 212 for the contiguous block of source IP addresses, 192.168.2.0/30, and the contiguous block of destination IP addresses, 192.168.3.0/30.

Once a new group SA is negotiated for the contiguous block of source IP addresses, 192.168.2.0/30, and the contiguous block of destination IP addresses, 192.168.3.0/30, the router 202 assigns the new group SA, 192.168.2.0/30 to 192.168.3.0/30, to the two source hosts, 204 and 206, and the two destination hosts, 214 and 216. In addition, the new group SA is stored in the SA database of the router 202, and the existing four per-host SAs (192.168.2.1 to 192.168.3.1, 192.168.2.2 to 192.168.3.1, 192.168.2.1 to 192.168.3.2, and 192.168.2.2 to 192.168.3.2) stored in the SA database of the router 202 can be deleted (i.e., the assignment of the four per-host SAs is removed from the two source hosts, 204 and 206, and the two destination hosts, 214 and 216). As a result, a single group SA replaces four per-host SAs in the SA database of the router 202.

Similarly, once another new group SA is negotiated for the source IP address, 192.168.2.3, and the contiguous block of destination IP addresses, 192.168.3.0/30, the router 202 assigns the new group SA, 192.168.2.3/32 to 192.168.3.0/30, to the source host 208 and the two destination hosts, 214 and 216. In addition, the new group SA is stored in the SA database of the router 202, and the existing two per-host SAs (192.168.2.3 to 192.168.3.1 and 192.168.2.3 to 192.168.3.2) stored in the SA database of the router 202 can be deleted (i.e., the assignment of the two per-host SAs is removed from the source host 208 and the two destination hosts, 214 and 216). As a result, a single group SA replaces two per-host SAs in the SA database of the router 202, thereby reducing the number of SAs that need to be stored for the hosts 208, 216 and 216.

Using IPsec selector coalescing for per-host SAs, two IPsec group SAs 210 are renegotiated between the router 202 and the router 212 for secure communications between the three hosts, 204, 206, and 208, and the two hosts, 214 and 216. As a result, two group SAs (e.g., the IPsec SAs 210) replace six per-host SAs (e.g., the IPsec SAs 110 in FIG. 1) in the SA database of the router 202, thereby resulting in overhead reduction in the SA database of the router 202 and allowing for more hosts to maintain active sessions simultaneously.

When the router 202 has, for example, seven hosts with contiguous IP addresses from 192.168.2.1 to 192.168.2.7, and each host is assigned to a per-host SA, the router 202 can renegotiate a new group SA with source IP addresses of 192.168.2.0/29 and destination IP addresses of 192.168.3.0/30. As a result, the new group SA can replace fourteen per-host SAs. As the size of contiguous IP addresses increases, the overhead reduction in the SA database increases.

In some implementations, not all endpoints (e.g., both routers 202 and 212) can support coalescing SAs (e.g., implementing an IPsec subnet coalescing technique). For example, router 202 can use per-host SAs with coalescing, and router 212 can use SA selectors with/24 bit network. Through renegotiation between routers 202 and 212, the SAs between routers 202 and 212 can be coalesced up to a contiguous block of/24 bit IP addresses. However, if per-host SAs are used on both endpoints (e.g., routers 202 and 212), both endpoints need to support coalescing SAs in order to perform IPsec SA coalescing between the endpoints. For example, router 202 supports coalescing SAs, router 212 does not support coalescing SAs, and both routers 202 and 212 use per-host SAs. When the router 202 proposes a new, broader SA selector to the router 212, the router 212 will counter with a single host (e.g., 192.168.3.1/32) proposal. As a result, IPsec SA coalescing cannot be performed between routers 202 and 212. In such situation, to prevent wastefully sending payloads, the new SA is negotiated before the payloads are sent for the existing per-host SAs.

The router 202 and/or the router 212 may include any application, hardware, software, firmware, or combination thereof, configured to transmit and receive data packets in the networking environment 200. In some implementations, the operations performed by the router 202 and/or the router 212 can be implemented as operations performed by a data processing apparatus, on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The router 202 and/or the router 212 can also be implemented as special purpose logic circuitry, for example, a field programmable gate array (FPGA) or an application specific integrated circuit (ASIC).

Figure 3:
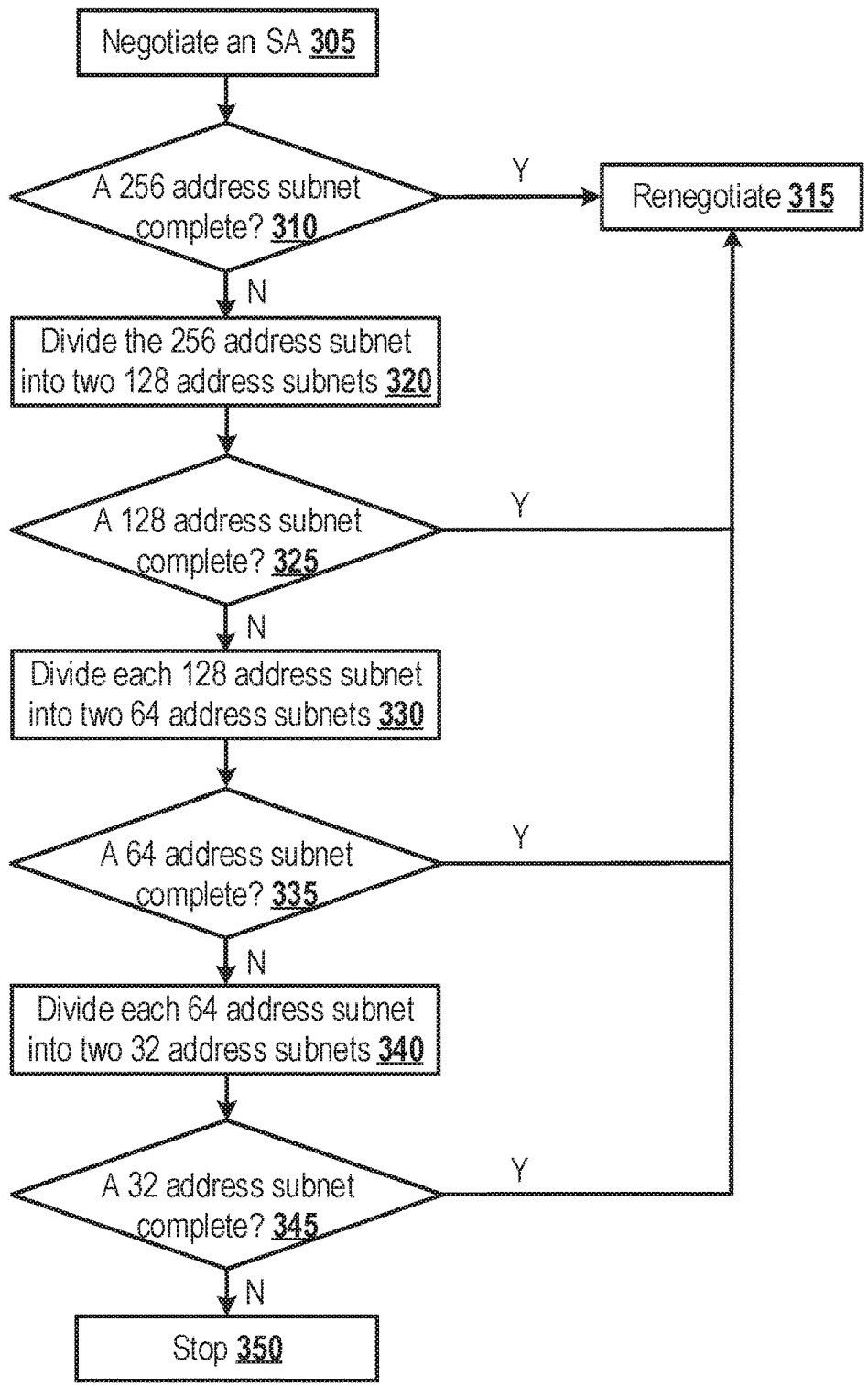
FIG. 3 is a block diagram illustrating an example IPsec subnet coalescing technique, according to an implementation of the present disclosure.

FIG. 3 is a block diagram illustrating an example IPsec subnet coalescing technique 300, according to an implementation of the present disclosure. The example IPsec subnet coalescing technique 300 can be performed, for example, by one or more telecommunications devices, such as those described with reference to FIG. 2 (e.g., the router 202, the router 212). The IPsec subnet coalescing technique 300 can also be implemented as instructions stored on a non-transitory, computer-readable medium that, when executed by one or more telecommunications devices (and/or data processing apparatus), configures the one or more telecommunications devices to perform and/or cause the one or more telecommunications devices to perform the actions of the IPsec subnet coalescing technique 300.

A Security Association (SA) is negotiated (305). Although in FIG. 3 the example IPsec subnet coalescing technique 300 runs or starts when a new SA is negotiated for purposes of example, the example IPsec subnet coalescing technique 300 can be performed periodically, or triggered by a predefined event, such as, the occupancy of an SA database exceeds a predefined threshold (e.g., 75%). In other words, if it is determined that at least the predefined threshold amount of the database storage capacity is being utilized to store SAs, the system can trigger performance of the technique 300.

A determination is made on whether a 256 address subnet is complete (310). In some implementations, the 256 address subnet is complete when all addresses (e.g., IP addresses) in the 256 address subnet have been assigned one or more SAs. In some implementations, the 256 address subnet is not complete when at least one address in the 256 address subnet has not been assigned one or more SAs. Although, in FIG. 3, 256 is used as the maximum size of an address subnet for purposes of example, any suitable number can be applied as the maximum size of an address subnet. For example, the maximum size of an address subnet can default to what is defined in an Access Control List (ACL). An ACL is a list of rules that match certain packet details (e.g., source address, destination address, port numbers). In IPsec, an ACL can define the maximum width of a network for an IPsec SA selector. In some implementations, the maximum size of an address subnet can be set by a user.

If it is determined that the 256 address subnet is complete, a new SA for the 256 address subnet is renegotiated (315). In some implementations, when negotiating the new SA, all SAs that are being coalesced are re-negotiated. In some implementations, if each address in the 256 address subnet has been assigned a per-host SA, the new SA is a group SA for the 256 address subnet. In some implementations, after the new SA is renegotiated, the new SA is assigned to all addresses in the 256 address subnet. The new SA is then stored in an SA database, and previously stored SAs assigned to an address in the 256 address subnet are deleted from the SA database.

If it is determined that the 256 address subnet is not complete, the 256 address subnet is divided into two 128 address subnets (320). In some implementations, each 128 address subnet contains 128 contiguous addresses.

A determination is made on whether a 128 address subnet is complete (325). In some implementations, a 128 address subnet is complete when all addresses (e.g., IP addresses) in the 128 address subnet have been assigned one or more SAs. In some implementations, a 128 address subnet is not complete when at least one address in the 128 address subnet has not been assigned one or more SAs.

If it is determined that a 128 address subnet is complete, technique 300 proceeds to 315, and a new SA for each 128 address subnet that is complete is renegotiated. Otherwise, if it is determined that none of the 128 address subnets is complete, each 128 address subnet is divided into two 64 address subnets (330). In some implementations, each 64 address subnet contains 64 contiguous addresses.

A determination is made on whether a 64 address subnet is complete (335). In some implementations, a 64 address subnet is complete when all addresses (e.g., IP addresses) in the 64 address subnet have been assigned one or more SAs. In some implementations, a 64 address subnet is not complete when at least one address in the 64 address subnet has not been assigned one or more SAs.

If it is determined that a 64 address subnet is complete, technique 300 proceeds to 315, and a new SA for each 64 address subnet that is complete is renegotiated. Otherwise, if it is determined that none of the 64 address subnets is complete, each 64 address subnet is divided into two 32 address subnets (340). In some implementations, each 32 address subnet contains 32 contiguous addresses.

A determination is made on whether a 32 address subnet is complete (345). In some implementations, a 32 address subnet is complete when all addresses (e.g., IP addresses) in the 32 address subnet have been assigned one or more SAs. In some implementations, a 32 address subnet is not complete when at least one address in the 32 address subnet has not been assigned one or more SAs.

If it is determined that a 32 address subnet is complete, technique 300 proceeds to 315, and a new SA for each 32 address subnet that is complete is renegotiated. Otherwise, if it is determined that none of the 32 address subnets is complete, technique 300 stops (350). Although, in FIG. 3, 32 is used as the minimum coalescing size of an address subnet for purposes of example, any suitable number can be applied as the minimum coalescing size of an address subnet. For example, in FIG. 2, the minimum coalescing size of an address subnet is 2. In some implementations, the minimum coalescing size of an address subnet can be set by a user. In some implementations, the technique 300 continues in a breadth first fashion until the largest complete block of addresses is found, or until each smallest block of addresses has been examined.

Figure 4:
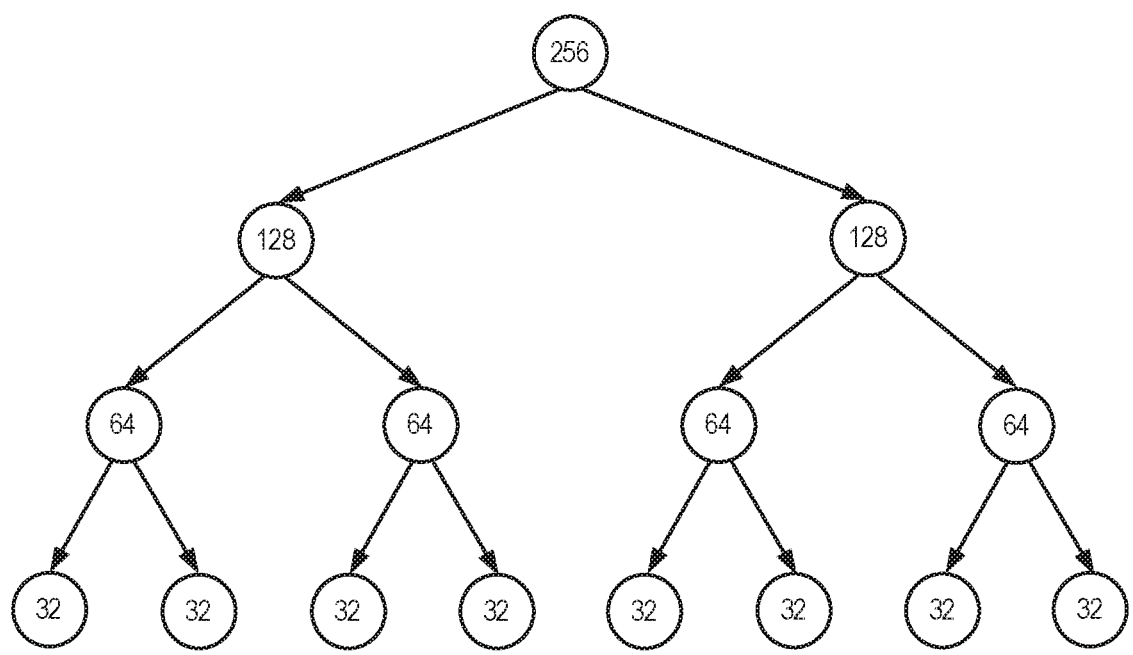
FIG. 4 is a diagram illustrating an example tree structure of SAs, according to an implementation of the present disclosure.

FIG. 4 is a diagram illustrating an example tree structure 400 of SAs, according to an implementation of the present disclosure. For purposes of example, the example tree structure 400 has a maximum size of 256 for an address subnet, and a minimum coalescing size of 32 for an address subnet, similarly to those described in FIG. 3. As illustrated in FIG. 4, the tree structure 400 includes one 256 address subnet, two 128 address subnets, four 64 address subnets, and eight 32 address subnets.

Figure 5:
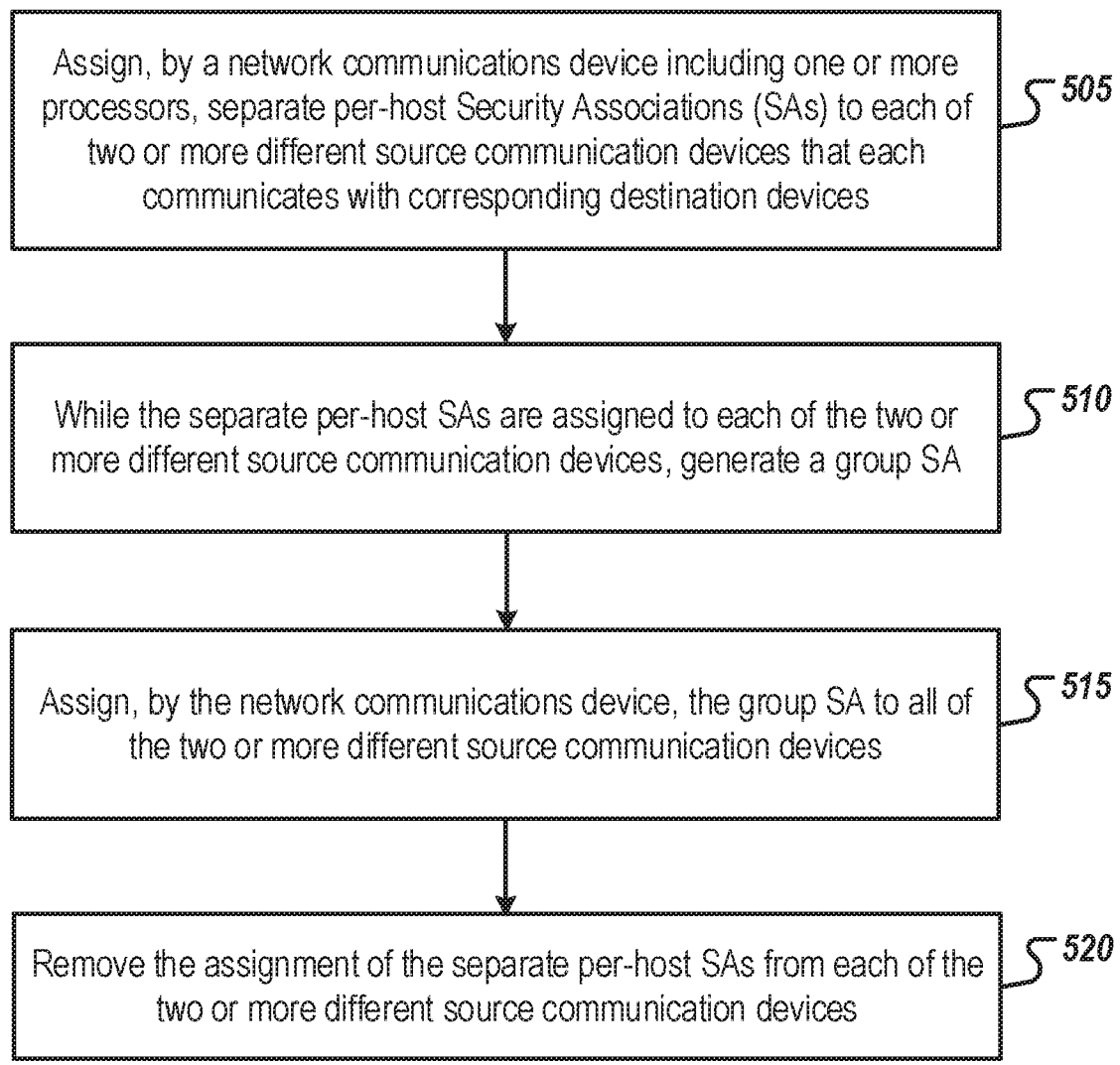
FIG. 5 is a flow chart illustrating an example method for IPsec selector coalescing for per-host SAs, according to an implementation of the present disclosure.

FIG. 5 is a flow chart illustrating an example method 500 for IPsec selector coalescing for per-host SAs, according to an implementation of the present disclosure. The example method 500 can be performed, for example, by one or more telecommunications devices, such as those described with reference to FIG. 2 (e.g., the router 202, the router 212). The example method 500 can also be implemented as instructions stored on a non-transitory, computer-readable medium that, when executed by one or more telecommunications devices (and/or data processing apparatus), configures the one or more telecommunications devices to perform and/or cause the one or more telecommunications devices to perform the actions of the example method 500.

Separate per-host Security Associations (SAs) are assigned, by a network communications device (e.g., router 202 in FIG. 2) including one or more processors, to each of two or more different source communication devices (e.g., hosts 204 and 206 in FIG. 2) (505). Each source communication device communicates with one or more corresponding destination communication devices (e.g., hosts 214 and 216 in FIG. 2). In some implementations, the two or more different source communication devices are directly connected to the network communications device. In some implementations, the separate per-host SAs are stored in an SA database of the network communications device.

A group SA (e.g., 192.168.2.0/30 to 192.168.3.0/30 in FIG. 2) is generated while the separate per-host SAs are assigned to each of the two or more different source communication devices (510). In some implementations, the group SA is negotiated between the network communications device and another network communications device (e.g., router 212 in FIG. 2). The corresponding destination communication devices are directly connected to the another network communications device.

The group SA (e.g., the same group SA) is assigned, by the network communications device, to all of the two or more different source communication devices (515). For example, the group SA can be stored in the SA database of the network communications device. In some implementations, before the group SA is generated, a block of different source communication devices that will all be assigned a same group SA is identified. For example, a group of different source communication devices that have contiguous Internet Protocol (IP) addresses is identified. In some implementations, a group of different source communication devices having IP addresses that are part of a same subnet is identified. In some implementations, a largest block of different source communication devices having IP addresses that are included in a same subnet is determined. All source communication devices in the largest block of different source communication devices have been assigned separate per-host SAs. For example, a determination is made on whether all addresses in the subnet are assigned separate per-host SAs. When all addresses in the subnet are assigned separate per-host SAs, the same group SA is assigned to all addresses in the subnet. When all addresses in the subnet are not assigned per-host SAs, the addresses in the subnet are segmented into two groups of addresses. In some implementations, the same group SA is assigned to each source communication device included in the block of different source communication devices.

In some implementations, when all addresses in the subnet are not assigned per-host SAs, a determination is made on whether all addresses in a given group of addresses from the two groups of addresses are assigned separate per-host SAs. When all addresses in the given group of addresses are assigned separate per-host SAs, the same group SA is assigned to all addresses in the given group of addresses. When all addresses in the given group of addresses are not assigned per-host SAs, the addresses in the given group of addresses are segmented into two additional groups of addresses.

The assignment of the separate per-host SAs is removed from each of the two or more different source communication devices that are assigned the group SA (520). In some implementations, the assignment of the separate per-host SAs is removed, by the network communications device, from each of the two or more different source communication devices in response to assigning the group SA to all of the two or more different source communication devices. For example, after the group SA is assigned and stored in the SA database of the network communications device, the separate per-host SAs stored in the SA database is deleted from the SA database.

The example method 500 shown in FIG. 5 can be modified or reconfigured to include additional, fewer, or different actions (not shown in FIG. 5), which can be performed in the order shown or in a different order. For example, after 515, a first determination is made that additional source communication devices have been assigned separate per-host SAs. A second determination is made that the additional source communication devices are part of a same block of devices as the two or more different source communication devices. A new group SA is assigned to each of the two or more different source communication devices and the additional source communication devices based on the second determination that the additional source communication devices are part of a same block of devices as the two or more different source communication devices. The assignment of the group SA is removed from the two or more different source communication devices. In some implementations, one or more of the actions shown in FIG. 5 can be repeated or iterated, for example, until a terminating condition is reached. In some implementations, one or more of the individual actions shown in FIG. 5 can be executed as multiple separate actions, or one or more subsets of the actions shown in FIG. 5 can be combined and executed as a single action. In some implementations, one or more of the individual actions shown in FIG. 5 may also be omitted from the example method 500.

Figure 6:
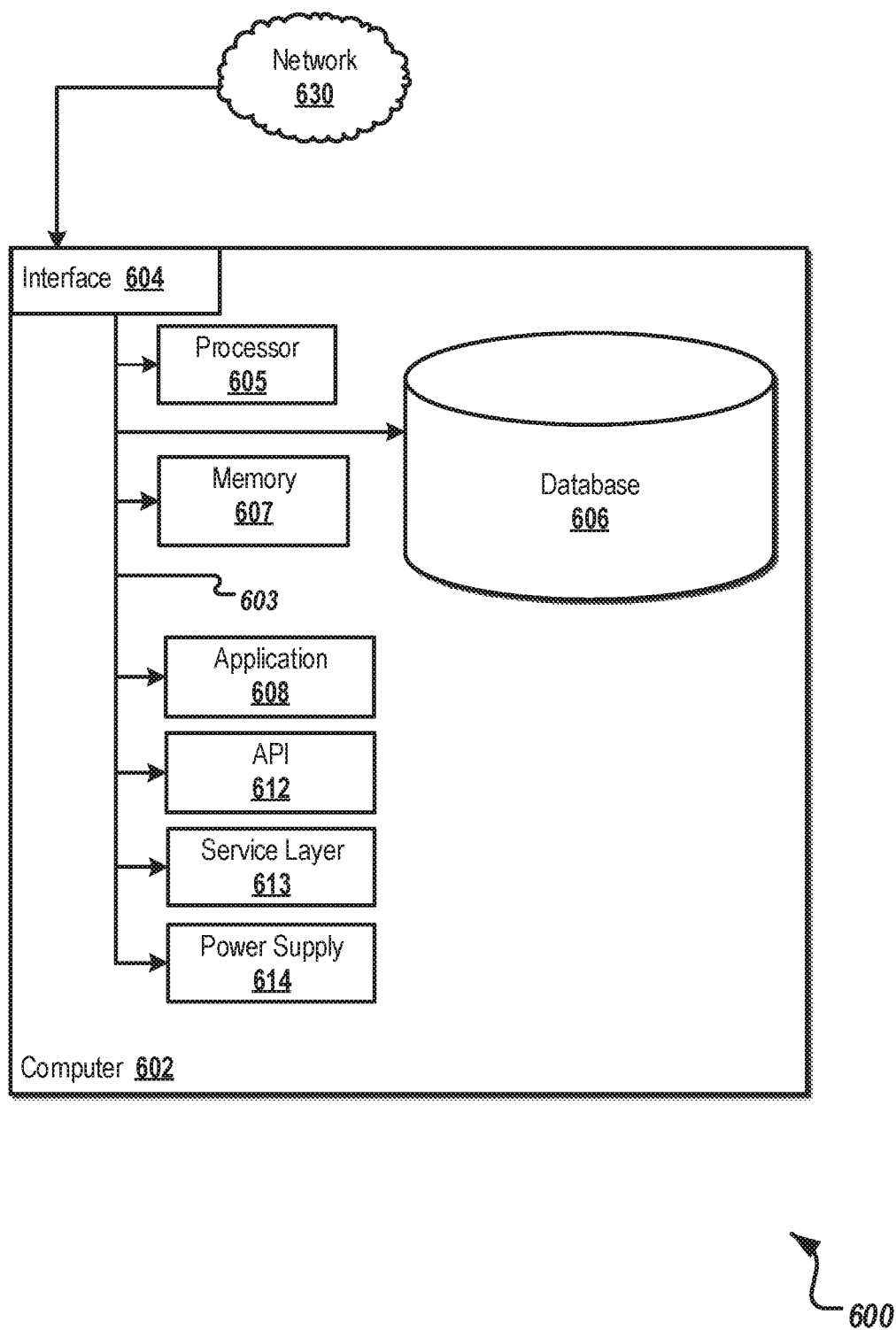
FIG. 6 is a block diagram illustrating an example of a computer system used to provide computational functionalities associated with described algorithms, methods, functions, processes, flows, and procedures, according to an implementation of the present disclosure.

FIG. 6 is a block diagram illustrating an example of a computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a computer system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

At a high level, the computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users (for example, from a command console or by another internal access method), external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and comprises logic encoded in software, hardware, or a combination of software and hardware. More specifically, the interface 604 can comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602.

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method, comprising:
   assigning, by a network communications device including one or more processors, separate per-host Security Associations (SAs) to each of two or more different source communication devices that each communicates with corresponding destination devices;
while the separate per-host SAs are assigned to each of the two or more different source communication devices, generating a single group SA;
determining that the two or more different source communication devices have contiguous Internet Protocol IP addresses;
in response to determining that the two or more different source communication devices the contiguous IP addresses:
assigning, by the network communications device, the single group SA to all of the two or more different source communication devices having the contiguous IP addresses within the same subnet; and
replacing, within a SA database of the network communications device, the separate per-host SAs with the single group SA that has been assigned to all of the two or more different source communication devices having the contiguous IP addresses.

2. The method of claim 1, further comprising:
identifying a block of different source communication devices that will all be assigned a same group SA, wherein assigning the single group SA to all of the two or more different source communication devices comprises assigning the same group SA to each source communication device included in the block of different source communication devices.

3. The method of claim 2, wherein identifying the block of different source communication devices that will all be assigned the same group SA comprises identifying a group of different source communication devices that have contiguous Internet Protocol (IP) addresses.

4. The method of claim 2, wherein identifying the block of different source communication devices that will all be assigned the same group SA comprises identifying a group of different source communication devices having IP addresses that are part of a same subnet.

5. The method of claim 2, wherein identifying the block of different source communication devices that will all be assigned the same group SA comprises determining a largest block of different source communication devices having IP addresses that are included in a same subnet, wherein all source communication devices in the largest block of different source communication devices have been assigned separate per-host SAs.

6. The method of claim 5, wherein determining a largest block of different source communication devices having IP addresses that are included in a same subnet comprises:
determining whether all addresses in the subnet are assigned separate per-host SAs;
assigning the same group SA to all addresses in the subnet when all addresses in the subnet are assigned separate per-host SAs; and
segmenting the addresses in the subnet into two groups of addresses when all addresses in the subnet are not assigned per-host SAs.

7. The method of claim 6, further comprising:
when all addresses in the subnet are not assigned per-host SAs:
determining whether all addresses in a given group of addresses from the two groups of addresses are assigned separate per-host SAs;
assigning the same group SA to all addresses in the given group of addresses when all addresses in the given group of addresses are assigned separate per-host SAs; and
segmenting the addresses in the given group of addresses into two additional groups of addresses when all addresses in the given group of addresses are not assigned per-host SAs.

8. The method of claim 2, further comprising:
after assigning the single group SA to all of the two or more different source communication devices:
determining that additional source communication devices have been assigned separate per-host SAs;
determining that the additional source communication devices are part of a same block of devices as the two or more different source communication devices;
assigning a new group SA to each of the two or more different source communication devices and the additional source communication devices based on the determination that the additional source communication devices are part of the same block of devices as the two or more different source communication devices; and
removing the assignment of the group SA from the two or more different source communication devices.

9. A telecommunications device, comprising:
a memory; and
one or more processors coupled to the memory, wherein the one or more processors are configured to perform operations comprising:
assigning separate per-host Security Associations (SAs) to each of two or more different source communication devices that each communicates with corresponding destination devices;
while the separate per-host SAs are assigned to each of the two or more different source communication devices, generating a single group SA;
determining that the two or more different source communication devices have contiguous Internet Protocol IP addresses;
in response to determining that the two or more different source communication devices the contiguous IP addresses:
assigning, by the network communications device, the single group SA to all of the two or more different source communication devices having the contiguous IP addresses within the same subnet; and
replacing, within a SA database of the network communications device, the separate per-host SAs with the single group SA that has been assigned to all of the two or more different source communication devices having the contiguous IP addresses.

10. The telecommunications device of claim 9, the operations further comprising:
identifying a block of different source communication devices that will all be assigned a same group SA, wherein assigning the single group SA to all of the two or more different source communication devices comprises assigning the same group SA to each source communication device included in the block of different source communication devices.

11. The telecommunications device of claim 10, wherein identifying the block of different source communication devices that will all be assigned the same group SA comprises identifying a group of different source communication devices that have contiguous Internet Protocol (IP) addresses.

12. The telecommunications device of claim 10, wherein identifying the block of different source communication devices that will all be assigned the same group SA comprises identifying a group of different source communication devices having IP addresses that are part of a same subnet.

13. The telecommunications device of claim 10, wherein identifying the block of different source communication devices that will all be assigned the same group SA comprises determining a largest block of different source communication devices having IP addresses that are included in a same subnet, wherein all source communication devices in the largest block of different source communication devices have been assigned separate per-host SAs.

14. The telecommunications device of claim 13, wherein determining a largest block of different source communication devices having IP addresses that are included in a same subnet comprises:
    determining whether all addresses in the subnet are assigned separate per-host SAs;
    assigning the same group SA to all addresses in the subnet when all addresses in the subnet are assigned separate per-host SAs; and
    segmenting the addresses in the subnet into two groups of addresses when all addresses in the subnet are not assigned per-host SAs.

15. The telecommunications device of claim 14, the operations further comprising:
    when all addresses in the subnet are not assigned per-host SAs:
        determining whether all addresses in a given group of addresses from the two groups of addresses are assigned separate per-host SAs;
        assigning the same group SA to all addresses in the given group of addresses when all addresses in the given group of addresses are assigned separate per-host SAs; and
        segmenting the addresses in the given group of addresses into two additional groups of addresses when all addresses in the given group of addresses are not assigned per-host SAs.

16. The telecommunications device of claim 10, the operations further comprising:
    after assigning the single group SA to all of the two or more different source communication devices:
        determining that additional source communication devices have been assigned separate per-host SAs;
        determining that the additional source communication devices are part of a same block of devices as the two or more different source communication devices;
        assigning a new group SA to each of the two or more different source communication devices and the additional source communication devices based on the determination that the additional source communication devices are part of the same block of devices as the two or more different source communication devices; and
        removing the assignment of the group SA from the two or more different source communication devices.

17. A telecommunications system, comprising:
    two or more different source communication devices; and
    a network communications device including one or more processors, wherein the network communications device is configured to perform operations comprising:
        assigning separate per-host Security Associations (SAs) to each of the two or more different source communication devices that each communicates with corresponding destination devices;
        while the separate per-host SAs are assigned to each of the two or more different source communication devices, generating a single group SA;
        determining that the two or more different source communication devices have contiguous Internet Protocol IP addresses;
        in response to determining that the two or more different source communication devices have the contiguous IP addresses:
            assigning, by the network communications device, the single group SA to all of the two or more different source communication devices having the contiguous IP addresses within the same subnet; and
            replacing, within a SA database of the network communications device, the separate per-host SAs with the single group SA that has been assigned to all of the two or more different source communication devices having the contiguous IP addresses.

18. The telecommunications system of claim 17, the operations further comprising:
    identifying a block of different source communication devices that will all be assigned a same group SA, wherein assigning the single group SA to all of the two or more different source communication devices comprises assigning the same group SA to each source communication device included in the block of different source communication devices.

19. The telecommunications system of claim 18, wherein identifying the block of different source communication devices that will all be assigned the same group SA comprises identifying a group of different source communication devices that have contiguous Internet Protocol (IP) addresses.

20. The telecommunications system of claim 18, wherein identifying the block of different source communication devices that will all be assigned the same group SA comprises identifying a group of different source communication devices having IP addresses that are part of a same subnet.

* * * * *

UNITED STATES PATENT AND TRADEMARK OFFICE
CERTIFICATE OF CORRECTION

PATENT NO. : 10,735,386 B2
APPLICATION NO. : 15/886586
DATED : August 4, 2020
INVENTOR(S) : Michael Arnold and Tyler Pearson Page 1 of 1

It is certified that error appears in the above-identified patent and that said Letters Patent is hereby corrected as shown below:

On the Title Page

In Column 1 ((54) Title), Line 2, delete "ASSOCIATION" and insert -- ASSOCIATIONS --, therefor.

In the Specification

In Column 1, Line 2, delete "ASSOCIATION" and insert -- ASSOCIATIONS --, therefor.

In the Claims

In Column 13, Line 10, Claim 1, after "devices" insert -- having --.

In Column 14, Line 39, Claim 9, after "devices" insert -- having --.

Signed and Sealed this
Twenty-second Day of September, 2020

Andrei Iancu
*Director of the United States Patent and Trademark Office*